United States Patent [19]

Nagao et al.

[11] Patent Number: 4,666,352

[45] Date of Patent: May 19, 1987

[54] PROFILE WORKING MACHINE

[75] Inventors: Takaaki Nagao, 796-58, Sakaine, Kashiwa-shi, Chiba-ken; Yotaro Hatamura, 12-11, Kohinata 2-chome, Bunkyo-ku, Tokyo; Kozo Ono, Toride, all of Japan

[73] Assignees: Takaaki Nagao, Kashiwa; Yotaro Hatamura; Hitachi Construction Machinery Co., Ltd., both of Tokyo, Japan

[21] Appl. No.: 776,801

[22] Filed: Sep. 17, 1985

[30] Foreign Application Priority Data

Sep. 28, 1984 [JP] Japan .................. 59-201487

[51] Int. Cl.[4] .................. B23C 9/00
[52] U.S. Cl. .................. 409/153; 409/187; 409/194; 408/11; 51/165.92; 364/474
[58] Field of Search .......... 318/563, 565, 566, 568 D; 364/167, 170, 474, 513; 408/85, 94, 98, 117, 127, 3, 8, 11, 13; 409/80, 131, 132, 141, 147, 148, 150, 153, 154, 156, 186, 187, 193, 194, 207, 208; 51/165.92

[56] References Cited

U.S. PATENT DOCUMENTS

| | | | |
|---|---|---|---|
| 3,548,172 | 12/1970 | Centner et al. | 408/3 X |
| 3,665,493 | 5/1972 | Glowzewski et al. | 409/80 X |
| 3,746,955 | 7/1973 | Kobayashi | 408/8 X |
| 4,440,530 | 8/1984 | Yamakage | 408/3 |

FOREIGN PATENT DOCUMENTS

| | | | |
|---|---|---|---|
| 2704388 | 3/1978 | Fed. Rep. of Germany | 364/474 |
| 0709325 | 1/1980 | U.S.S.R. | 364/474 |

Primary Examiner—John Sipos
Assistant Examiner—Steven P. Weihrouch
Attorney, Agent, or Firm—Oblon, Fisher, Spivak, McClelland & Maier

[57] ABSTRACT

A profile working machine is equipped with a support for holding a work in place, a working tool for machining the work, and drive and control systems for controlling the relative displacements between the support and the working tool. The profile working machine is to machine the work into a desired profile. The profile working machine is additionally provided with a load sensor for detecting each force and moment to be developed between the working tool and the work, a first computing unit for computing a working point and a tangential plane extending through the working point and in contact with the working tool, on the basis of the force and moment detected by the load sensor, and a second computing unit for computing, based on the working point and the tangential plane computed by the first computing unit and the forces detected by the load sensor, the values of the relative displacements between the working tool and the support in order to keep the magnitude and the direction of a reaction force exerted on the working tool on predetermined values.

4 Claims, 18 Drawing Figures

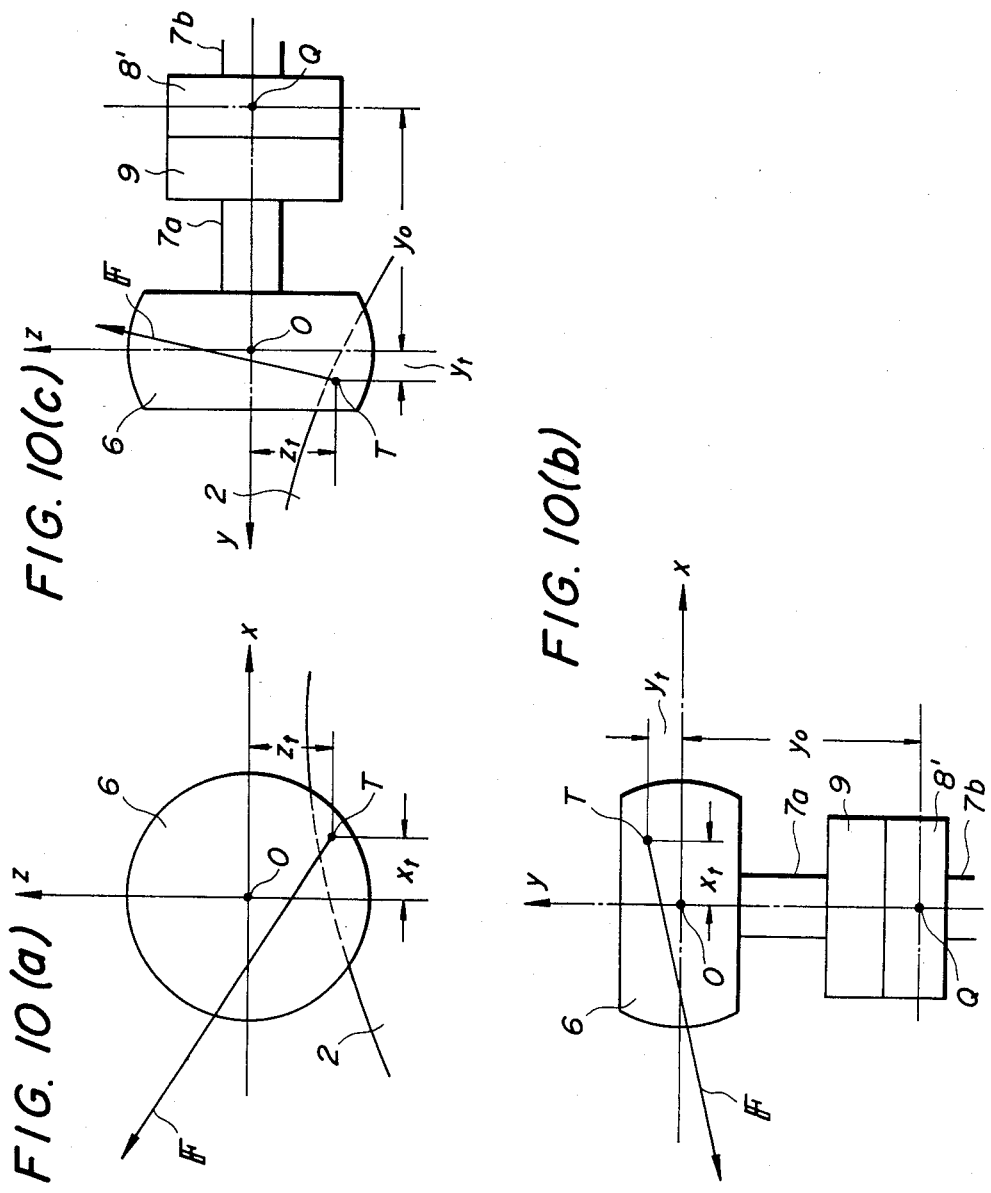

PROFILE WORKING MACHINE

FIELD OF THE INVENTION

This invention relates to a profile working machine such as a die-finishing cutting machine, a ceramics-working cutting machine, a three-dimensional milling machine or the like.

BACKGROUND OF THE INVENTION

When performing working or machining to form a free-form curved surface on a work such as die machining, the working or machining is in many instances conducted by mounting a ball end mill or the like on an NC milling machine or machining center. After such working or machining is performed, cutting tool marks are caused to remain on the thus-finished die. Hence, it cannot be used as a die without any further machining or treatment. This will next be described with reference to FIG. 2.

FIG. 2 is a perspective view illustrating cutting work by a ball end mill. In the drawing, there are shown a table 1 of a working machine, a work 2 fixedly held on the table 1, and a ball end mill 3 for cutting the work 2. Machining of the work by such a working machine is performed in the following manner. Namely, the work 2 is cut by shifting the table 1 in a direction indicated by the arrow A while moving the ball end mill 3 up and down. Upon completion of the cutting in the direction A, the table 1 is shifted a little bit in a direction indicated by the arrow B (pick-feed) and cutting is again performed in the direction A. These operations are repeated successively. In this case, cutting tool marks 4 are caused to remain due to the pick-feed on the surface of the work 2. Thus, the work 2 machined in such a way cannot be used as a final product. It is therefore necessary to add a further step to remove the cutting tool marks 4 in order to convert the above-machined work 2 into a final product. Incidentally, the above-described cutting tool marks 4 are left with a substantially equal interval on the surface of the work 2 and their heights range approximately from 0.1 mm to 0.2 mm. It should be noted that the cutting tool marks 4 shown in FIGS. 2 and 3 are exaggerated to facilitate their understanding. The heights of these cutting tool marks 4 must be reduced to at least 1 $\mu$m to 0.5 $\mu$m.

Conventionally, the above-machined work was manually worked with a shafted grinder held by a hand. Assuming now that one would employ the prior art technique and perform it mechanically, the following machine may be contemplated.

FIG. 3 is a perspective view showing conventional grinding work, in which like elements of structure to those shown in FIG. 2 will be designated by like reference numerals. Numeral 5 indicates a shafted grinder which is attached to a working machine. The profile of the work is in advance stored in a computer or the like and, on the basis of the thus-stored information, cutting tool marks 4 are traced by the shafted grinder. However, as mentioned, above, the heights of the cutting tool marks 4 are as low as several tenths millimeter or so, and their sizes and shapes are irregular. Thus, it is impossible to finish the surface of the work into any sufficiently smooth surface if one relies upon the accuracy achieved merely by storing the profile of the work 2 in a computer. Namely, the working tool may cut the work 2 too deep at certain parts and may be detached from the work 2 at some other parts.

The above method is accompanied by another serious drawback. It cannot be applied unless profile data of each work are available in advance. It has thus been usual to carry out the removal of cutting tool marks 4 manually, because the automatic grinding machine conceivable from the prior art is accompanied by such serious drawbacks as mentioned above, and no other suitable automatic grinding machine is available. This applies not only to the above-described machining work, but also to general profile-machining work. Such machining work has prevented full automation of machining steps, resulting in the need for lots of man power and time.

In order to solve such problems of the prior art techniques and enable automatic machining, the present inventors conceived that the above machining could be achieved by machining the surface of a work while pressing a working tool at a constant pressing force against the surface of the work and tracing the profile of the surface of the work. With a view toward materializing the above idea, the following study was carried out. The study will next be described with reference to FIGS. 4(a), 4(b) and 4(c).

FIGS. 4(a), 4(b) and 4(c) are respectively a front view, plan view and side view of a working tool and work. It is necessary to control the relative positional relationship between the working tool and the work in order to press the working tool at a constant pressing force against the work as mentioned above. For this purpose, it is necessary to preset coordinate axes. FIGS. 4(a) through 4(c) show such coordinate axes. In the figures, there are shown a table 1, a work 2, and a working tool 6. The working tool 6 has a center O of rotation, and it has a profile which contains a spherical surface having a radius r. Numeral 7a indicates an arm for rotating the working tool 6, and numeral 7b is a support arm. Numeral 8 designates a load sensor connected rigidly to the support arm 7b, and numeral 9 is a drive source for rotating the arm 7a. The drive source 9 is attached rigidly to one end of the load sensor 8, which one end is opposite to the end to which the support arm 7b is rigidly connected. A variety of load sensors have been known for the load sensor 8. It is however desirable to use a load sensor of the type proposed in Japanese Patent Laid-Open No. 62497/1985 (which corresponds to U.S. patent application Ser. No. 605,212 filed Apr. 30, 1984 now U.S. Pat. No. 4,268,745). The support arm 7b is coupled to an unillustrated main body of a working machine and is rotated and displaced three-dimensionally. As illustrated in the figures, a coordinate system X-Y-Z has been established with a suitable portion Om of the main body of the working machine being as an origin, while a coordinate system x-y-z is established with the center O of rotation of the working tool 6 being as its origin. Letter T indicates a point of action (working point) of the working tool 6 on the work 2, whereas letter F indicates a working reaction force exerted on the working tool 6. Incidentally, the table 1 is, in most general forms, turnable about any of three axes which are not contained in the same plane. This function of the table is however omitted in the figures.

Description will next be made of grinding work where the surface of the work 2 is flat. FIG. 5 is an enlarged front view of the working tool 6 and the work 2. In the figure, there are shown the work 2, the working tool 6, the working point T, the working reaction force F, and the flat surface $P_{t1}$ on the work 2. Let's now establish a force coordinate system $\xi$-$\zeta$, which includes the working point T as its origin, as shown in the figure. Namely, the $\zeta$-axis is placed as a line passing through the working point T and the center O of the working tool 6, while the $\xi$-axis is defined as an intersecting line between the plane $P_{t1}$, which is perpendicular to the $\zeta$-axis, and a plane defined by the feeding direction (the direction of the x-axis) of the working tool 6 and the $\zeta$-axis. Since the coordinate system has been established in the above-mentioned manner, the $\zeta$-axis is coincided with the z-axis, and the $\xi$-axis extends in parallel with the x-axis. The coordinate system $\xi$-$\zeta$ has been established in the above-mentioned manner in order to handle the $\xi$-axis force component $F_\xi$ of the working reaction force F as the tangential force component of the grinding work, the $\zeta$-axis force component $F_\zeta$ as a normal force component, and an angle $\psi(\psi=\tan^{-1} F_\xi/F_\zeta)$ as the direction of the reaction force. It is hence possible to keep working conditions under optimum conditions by controlling these tangential force component $F_z$, normal force component $F_\zeta$ and angle $\psi$ at suitable values.

By the way, in grinding work, the magnitude F and direction $\psi$ of the working reaction force F change in various ways. Conditions under which the grinding efficiency and the quality of finishing are optimized may be achieved by controlling the magnitude F and direction $\psi$ of the working reaction force F to their respective optimum values $F_0$, $\psi_0$. In view of this, a control system shown in FIG. 6 may be contemplated.

FIG. 6 is a system diagram of a working machine, in which the working machine is applied to a flat work surface. In the figure, there are shown a working tool/work system 10 composed of the working tool 6, the table 1, the work 2, and the like, a load sensor 8 shown in FIGS. 4(a) and 4(b), and a drive and control system 11 for reach of the individual axes. The drive and control systems 11 for the respective axes are composed of drive and control systems, that are adapted to control the drive of the working tool 6 in the directions of the respective axes on the basis of the X-Y-Z coordinate system, and other drive and control systems for controlling the tiltings ($\theta_1$, $\theta_2$, $\theta_3$) about the three axes so as to control the relative positions of the working tool 6 and the work 2. The drive and control systems 11 drive and control the working tool 6 and/or the table 1 so as to establish desired relative positions between the working tool 6 and the work 2. Designated at numeral 12 is a controlling and computing unit for performing prescribed operations in accordance with each detection signal from the load sensor 8.

When the working tool 6 is being driven in the direction x as illustrated in FIG. 5, components $F_x$ (which is equal to the force component $F_\xi$ in this case) and $F_z$ (which is equal to the force component $F_\zeta$) of a reaction force exerted at the working point T are detected by the load sensor 8, and the detection signals of the load sensor 8 are output to the controlling and computing unit 12. The controlling and computing unit 12 then computes, based on the detection signals, such desirable values $\overline{X}, \overline{Y}$ of the relative positions X,Y between the working tool 6 and the work 2 that the magnitude F ($F=\sqrt{F_\xi^2+F_\zeta^2}=\sqrt{F_x^2+F_z^2}$) and direction $\psi$ ($\psi=\tan^{-1}F_\xi/F_\zeta=\tan^{-1}F_x/F_z$) should become their respective optimum values $F_0$ and $\psi_0$. The values $\overline{X}, \overline{Z}$ computed at the controlling and computing unit 12 are then input to the drive and control systems 11 for the respective axes. In accordance with the values $\overline{X}, \overline{Z}$, the drive and control systems 11 for the respective axes change the relative positions in the working tool/work system 10 to new relative positions X,Z. As a result, the magnitude F and the direction $\psi$ of the reaction force are maintained respectively at their optimum values $F_0$ and $\psi_0$. Hence, the working tool 6 is pressed under a constant pressing force against the work 2, thereby to permitting automatic machining without developing breakage or abrupt wearing on the working tool 6 while maintaining the optimum working conditions.

Here, the operation at the controlling and computing unit 12 will be described in further detail. It is dependent on the material of the work 2 and the material, shape, rotation speed, rotating direction, etc. of the working tool 6 how the working reaction force changes in accordance with a varied depth of cut and a feeding speed. Namely, the working reaction force is not constant. Therefore, it is not possible to show the computing means of the controlling and computing unit 12 in a general form. According to findings obtained through experiments, the direction $\psi$ of the working reaction force remains substantially at a constant value $\psi_0$ in the neighbourhood of practical feeding speeds and depths of cut. However, for such practical feeding speeds and depths of cut, only the magnitude F of the working reaction force varies in accordance with the details of each grinding specification as values F', F'' as shown by broken lines in FIG. 5. Therefore, the working reaction force can be controlled if either one of the values $F_\zeta$ and $F_\xi$, which are components of the working reaction force, is detected and the thus-detected value $F_\zeta$ or $F_\xi$ is controlled to the $\zeta$-axis force component $F_{\xi 0}$ of the above-described optimum value $F_0$. Based on the above concept, the control algorithm of the controlling and computing unit 12 will hereinafter be described.

The controlling and computing unit 12 may be adapted to perform an operation in such a way that, by paying attention for example only to the normal force component $F_\zeta$, a value capable of controlling the relative positions of the working tool 6 and the work 2 in the direction of the $\zeta$-axis (which is equal to the direction of the z-axis in this case) so as to make the force component $F_\zeta$ approach the optimum value $F_{\zeta 0}$ is calculated. For this purpose, the speed $v_\zeta$ in the direction of the $\zeta$-axis may be chosen in such a way that it either increases or decreases depending on the difference $\Delta F_\zeta(\Delta F_\zeta=F_\zeta-F_{\zeta 0})$ between the force component $F_\zeta$ and the optimum value $F_{\zeta 0}$. The speed $v_\zeta$ may for example be chosen to equal $A_1(F_\zeta-F_{\zeta 0})$, in which $A_1$ is a positive constant, and the optimum value $F_{\zeta 0}$ is represented by $F_0\cos\psi_0$. Supposing that the speed $v_\xi$ in the direction of the $\xi$-axis, which is equivalent to the feeding direction, is always kept at a constant feeding speed $v_f$, the velocities $v_x, v_z$ in the direction of the x-axis and z-axis are respectively represented as follows:

$$v_x = v_\xi = v_f \text{(constant)} \quad (1)$$

$$v_z = v_\zeta = A_1(F_\zeta - F_{\zeta 0}) = A_1(F_z - F_0\cos\psi_0)$$

Furthermore, supposing that the advancing direction of the central point O of the working tool 6 is at an angle $\phi$ as measured from the positive direction of the x-axis, the angle can be represented as follow:

$$\phi = \tan^{-1}\frac{A_1(F_\zeta - F_{\zeta 0})}{v_f} = \tan^{-1}\frac{A_1(F_z - F_0\cos\psi_0)}{v_f} \quad (2)$$

Since the x-axis and z-axis are respectively parallel to the coordinate axes X and Z of the main body of the working machine, the values $\overline{X}$ and $\overline{Z}$ may be calculated on the basis of the outputs from the controlling and computing unit 12 in the above case while supposing $\dot{X} = v_x$ and $\dot{Z} = v_z$.

The above-described control algorithm has been given merely by way of example. Various other methods may also be contemplated. Although the speed $v_\xi$ in the feeding direction is set as the constant value $v_f$ in the above-described method, it may also be possible to employ such a way of thinking that the absolute value of speed of the working tool 6 at each moment upon proceeding with machining while moving the working tool 6 slightly up and down in accordance with the profile of the work 2 is chosen as an ideal feeding speed $v_f$ (which may be determined experimentally). In this case, the speeds $v_z$, $v_x$ may be chosen as follows:

$$v_z = v_\zeta = A_1(F_\zeta - F_{\zeta 0}) = A_1(F_z - F_0\cos\psi_0) \quad (3)$$

$$v_x = v_\xi = \sqrt{v_f^2 - v_\zeta^2} = \sqrt{v_f^2 - A_1{}^2(F_\zeta - F_{\zeta 0})^2}$$

$$= \sqrt{v_f^2 - A_1{}^2(F_z - F_0\cos\psi_0)^2}$$

When the speeds $v_z$, $v_x$ are chosen as described above, the angle $\phi$ can be expressed as follow:

$$\phi = \sin^{-1}\frac{A_1(F_\zeta - F_{\zeta 0})}{v_f} = \sin^{-1}\frac{A_1(F_z - F_0\cos\psi_0)}{v_f} \quad (4)$$

The above-described control algorithm of the controlling and computing unit 12 is to perform continuous control in the direction of the $\zeta$-axis in accordance with the difference $\Delta F_\zeta$ between the force component $F_\zeta$ and the optimum value $F_{\zeta 0}$. The following means may however, be employed in order to further simplify the operation and control in the controlling and computing unit 12. Such means will next be described with reference to a block diagram depicted in FIG. 7.

FIG. 7 is an enlarged front view of the working tool 6 and the work 2, for describing the operation of the controlling and computing unit. In the figure, forces, angle, points, axes, etc. similar to those shown in FIG. 5 are identified by like reference letters. $D_1$–$D_5$ are vectors indicating the magnitudes and directions of speeds preset with the point O being a center. In this simplified means, the degrees of difference between the detected force component $F_\zeta$ and its optimum value $F_{\zeta 0}$ are classified into five ranges, and the velocity in each range with which the working tool 6 should move to let $F_\zeta$ coincide with $F_{\zeta 0}$ is made correspond to each one of the five vectors $D_1$–$D_5$. Thus an x-axis component $v_x$ and a z-axis component $v_z$ which the controlling and computing unit 12 should output are gained from each vector. Velocity components to be obtained when the five ranges are rendered corresponding to the vectors respectively may be summarized as shown in Table 1.

TABLE 1

| Value $F_\zeta$ | $\phi$ | Direction $D_i$ | $v_x$ | $v_z$ |
|---|---|---|---|---|
| $F_\zeta < 0.4F_{\zeta 0}$ | −90° | $D_1$ | 0 | $-v_0$ |
| $0.4F_{\zeta 0} \leq F_\zeta < 0.8F_{\zeta 0}$ | −45° | $D_2$ | $v_0$ | $-v_0$ |
| $0.8F_{\zeta 0} \leq F_\zeta < 1.2F_{\zeta 0}$ | 0° | $D_3$ | $v_0$ | 0 |
| $1.2F_{\zeta 0} \leq F_\zeta < 1.6F_{\zeta 0}$ | 45° | $D_4$ | $v_0$ | $v_0$ |
| $1.6F_{\zeta 0} \leq F_\zeta$ | 90° | $D_5$ | 0 | $v_0$ |

In Table 1, the value $v_0$ is a constant value which is chosen from working specification and is close to the ideal feeding speed $v_f$. In the above means, the angle $\phi$ is limited discretely to five directions, unlike the said means for performing continuous control in the direction of the $\zeta$-axis. Furthermore, the speeds $v_x$, $v_y$ are limited in advance to the three values 0, $v_0$ and $-v_0$. Therefore, it may be expected that the control may somewhat lack smoothness. However, the cycle time of operations is a very small value. Accordingly, no inconvenience or problem will practically arise even when control is performed by such means. In digital control making use of a microcomputer, the outputs $v_x$, $v_z$ may each require only three levels which correspond to the values 0, $v_0$ and $-v_0$. Thus, the computing system can be simplified to a significant extent. The constants which are employed in Table 1 to classify the values $F_\zeta$ are not necessarily limited to the values given in Table 1, but may stand for a variety of suitable values.

The foregoing is the matter studied by the present inventors. In the above-described manner, it will become possible to press the working tool 6 at a constant pressing force against the surface of the work and to perform automatic machining without developing breakage or abrupt wearing on the working tool 6 while maintaining optimum machining conditions. However, the above control is fundamentally effective only where the surface of the work 2 is a flat surface. It is accompanied by a problem that it cannot be successfully applied when the surface of the work 2 is a curved-surface.

OBJECT OF THE INVENTION

The present invention has been completed with the foregoing in view. An object of this invention is therefore to provide a profile working machine which can automatically machine a work having a curved surface, the profile of which is not exactly known, without developing breakage or abrupt wearing on a working tool.

SUMMARY OF THE INVENTION

In order to attain the above-described object, the present invention provides a profile working machine equipped with a support for holding a work in place, a working tool for machining the work, and drive and control systems for controlling the relative displacements between the support and the working tool and adapted to machine the work into a desired profile, which machine comprises:

a load sensor for detecting each force and moment to be developed between the working tool and the work;

a first computing unit for computing a working point and a tangential plane extending through the working point and in contact with the working tool, on the basis of the force and moment detected by the load sensor; and a second computing unit for computing, based on the working point and tangential plane computed by the first computing unit and the forces detected by the load sensor, the values of the relative displacements between the working tool and the support in order to keep the magnitude and the direction of the reaction force exerted on the working tool on predetermined values.

The present invention performs working or machining by tracing the shape of a curved-surface of each work while maintaining the working reaction force, which is exerted to the working tool, at optimum magnitude and direction. It is thus possible to automatically work or machine a work, the exact shape of which is unknown, under ideal working conditions without developing breakage or abrupt wearing on the working tool. Therefore, the working is rendered easy, leading to man power saving of the working and uniform accuracy of working finish. As a result of the working, data on the shape of the work can be collected, thereby making it possible to proceed efficiently with subsequent steps.

BRIEF DESCRIPTION OF THE DRAWINGS

The above and other objects, features and advantages of the present invention will become apparent from the following description and the appended claims, taken in conjunction with the accompanying drawings, in which:

FIGS. 10(a), 10(b) and 10(c) are respectively enlarged front, plan and side views of the working tool and work when the surface of the work changes three-dimensionally;

DETAILED DESCRIPTION OF THE PRESENTLY PREFERRED EMBODIMENTS

The present invention will hereinafter be described on the basis of certain embodiments of this invention which are shown in the accompanying drawings.

Figure 1:
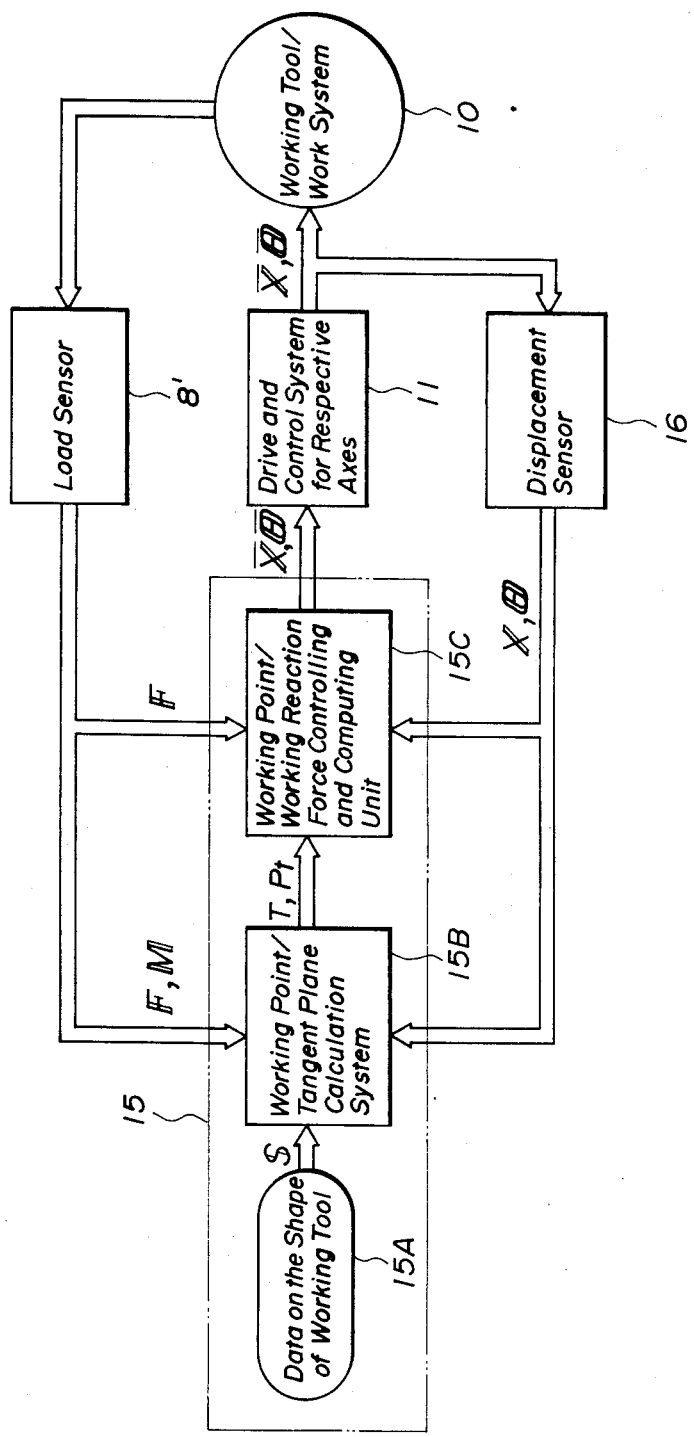
FIG. 1 is a system diagram of a profile working machine according to one embodiment of this invention.
Figure 2:
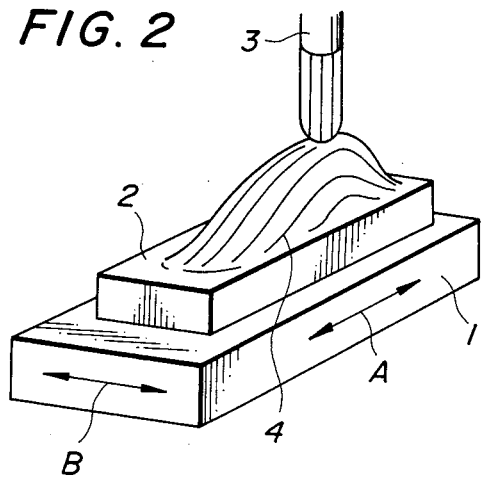
FIG. 2 is a perspective view showing cutting work by a ball end mill.
Figure 3:
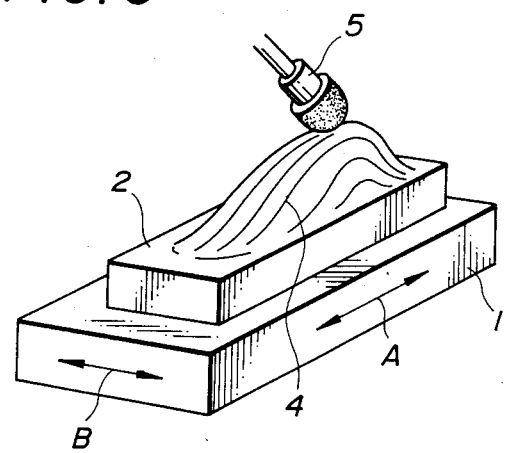
FIG. 3 is a perspective view showing conventional grinding work.
Figure 4:
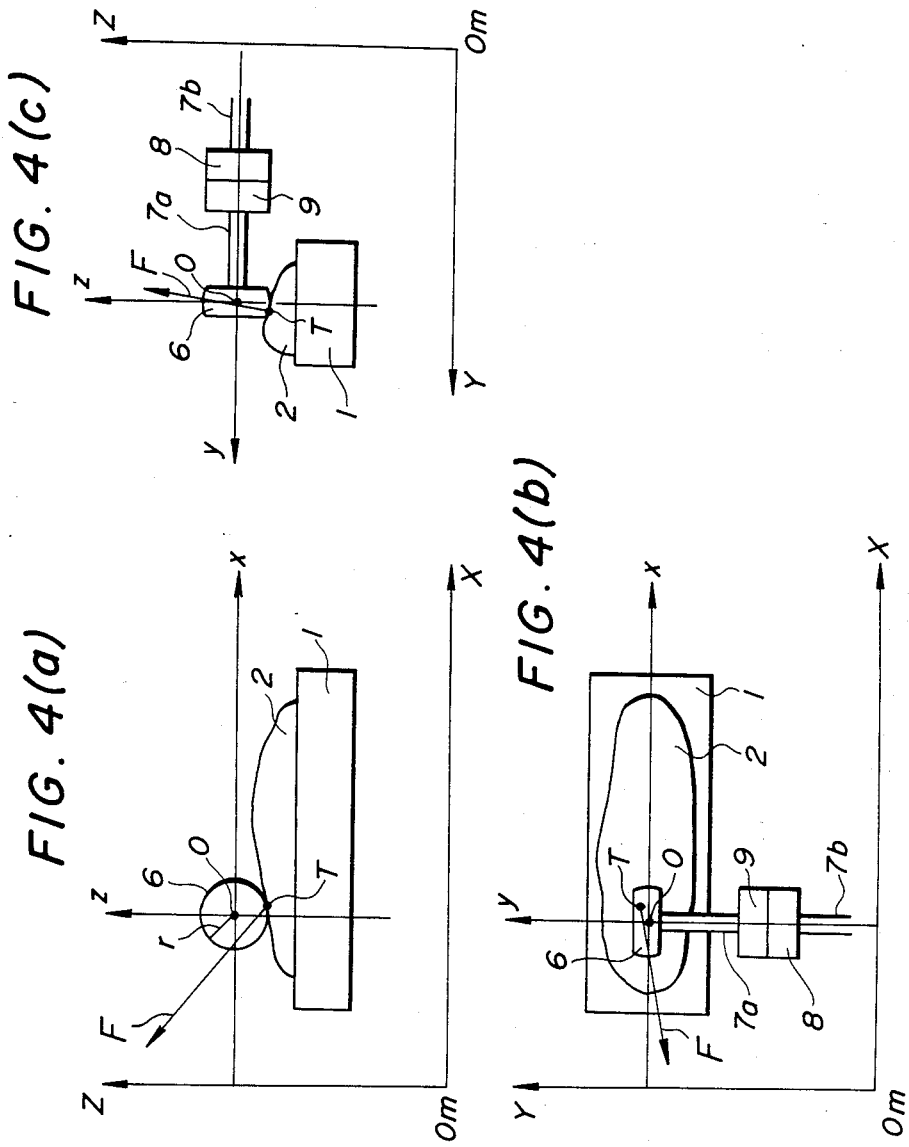
FIGS. 4(a), 4(b) and 4(c) are resspectively front, plan and side views of a working tool and a work.
Figure 6:
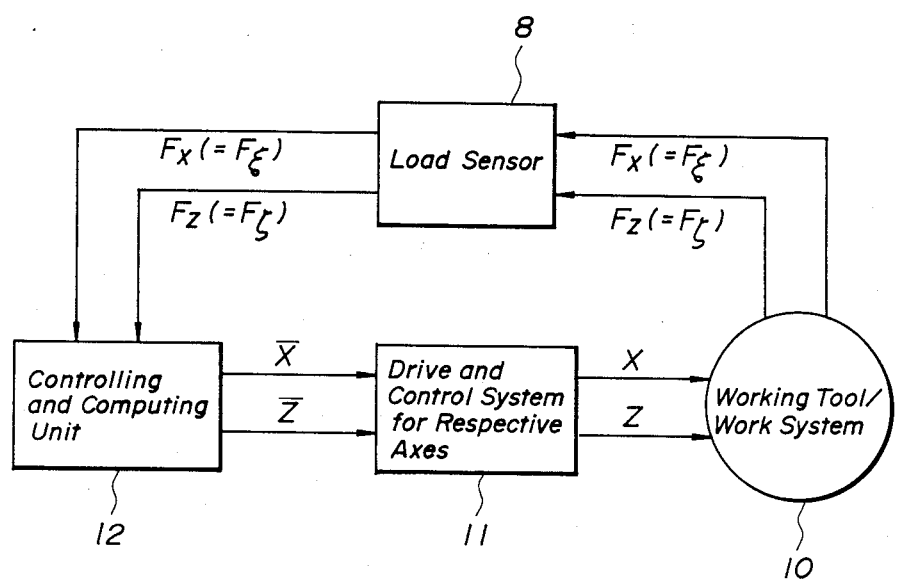
FIG. 6 is a system diagram of a working machine where the surface of the work is flat.

FIG. 1 is a system diagram of a profile working machine according to one embodiment of this invention. In the figure, units of the system similar to those illustrated in FIG. 6 are indicated by like reference numerals. Numeral 8' indicates a load sensor for detecting force components along respective axes and moment components about respective axes. Designated at numeral 15 is a controlling and computing unit the structure of which is different from the controlling and computing unit 12 illustrated in FIG. 6. The controlling and computing unit 15 is composed of a memory 15A for storing data on the shape of a working tool, a system 15B for calculating a working point and tangential plane (which may hereinafter be called "working point/tangential plane calculation system 15B"), and a controlling and computing unit 15C for the working point and working reaction force (which may hereinafter be called "working point/working reaction force controlling and computing unit 15C"). Numeral 16 indicates displacement sensors for detecting displacements of the working tool 6 and the table 1. In the machine of this embodiment, the same coordinate systems X-Y-Z and x-y-z as those shown in FIGS. 4(a) through 4(c) are employed.

Let's now suppose that the surface of the work 2 is being machined by the working tool 6. When the relative positions or relative angles of spatial orientation of the working tool 6 and work 2 vary, the working reaction force $\widehat{F}$ and working point T {shown in FIGS. 4(a) through 4(c)}, which are determined by such parameters as the rigidity of the working tool 6, work 2, and the main body of the working machine also vary. Here, the load sensor 8' detects the working reaction force F and a moment $\widehat{M}$ ($M_x, M_y, M_z$) produced by the force components of the working reaction force. The working point/tangential plane calculation system 15B is input with the force $\widehat{F}$ and the moment $\widehat{M}$ detected by the load sensor 8' as well as the relative positions X,Y,Z (hereinafter represented generally by "X") and relative angles of spatial orientation $\theta_1, \theta_2, \theta_3$ (hereinafter represented generally by "$\widehat{H}$)") of the working tool 6 and the table 1, which relative positions and angles have been detected by the displacement sensors 16, and dimensional data $\widehat{S}$ of the working tool 6 indicated by the memory 15A for storing data on the shape of the working tool. Based on the thus-input information, the working point/tangential plane calculation system 15B determines the coordinate values of the working point T and the tangential plane $P_t$ which passes through the working point T and is in contact with the working tool 6. The working point/working reaction force controlling and computing unit 15C is fed with the working point T and the tangential plane $P_t$ determined by the working point/tangential plane calculation system 15B, the force $\widehat{F}$ detected by the load sensor 8', and the outputs $\overline{X}, \widehat{H}$) of the displacement sensor 16. Based on the thus-input values, the working point/working reaction force controlling and computing unit 15C computes the relative positions and relative angles of spatial orientation required respectively for the working tool 6 and the work 2, and then outputs them as command values $\overline{X}, \widehat{H}$) to the drive and control systems 11 for the respective axes. Thereafter, the drive and control systems 11 for the respective axes drive and control the working tool 6 and the work 2 on the basis of the command values $\overline{X}, \widehat{H}$) so that the working tool 6 and the work 2 satisfy the above-mentioned desired relative positions and relative angles of spatial orientation. The above-mentioned relative positions and relative angles of spatial orientation, which are computed at the working point/working reaction force controlling and computing unit 15C, are relative positions and relative angles of spatial orientation which are both required to hold the working point T within the machinable range of the working tool 6 or desirably within a range permitting best working conditions and also to maintain the magnitude and direction of the working reaction force F within the ranges of values (optiumum values) capable of satisfying optimum working conditions.

Owing to the above structure, the working tool 6 is pressed at a constant pressing force against the work 2 even when the work 2 has a three-dimensionally curved surface, to say nothing of a horizontal surface. Thus, automatic machining can be performed without developing breakage or abrupt wearing on the working tool 6 while maintaining the optimum working conditions.

In order to permit clearer understanding of the above-described embodiment, further description will be made by giving the following specific examples.

Figure 8:
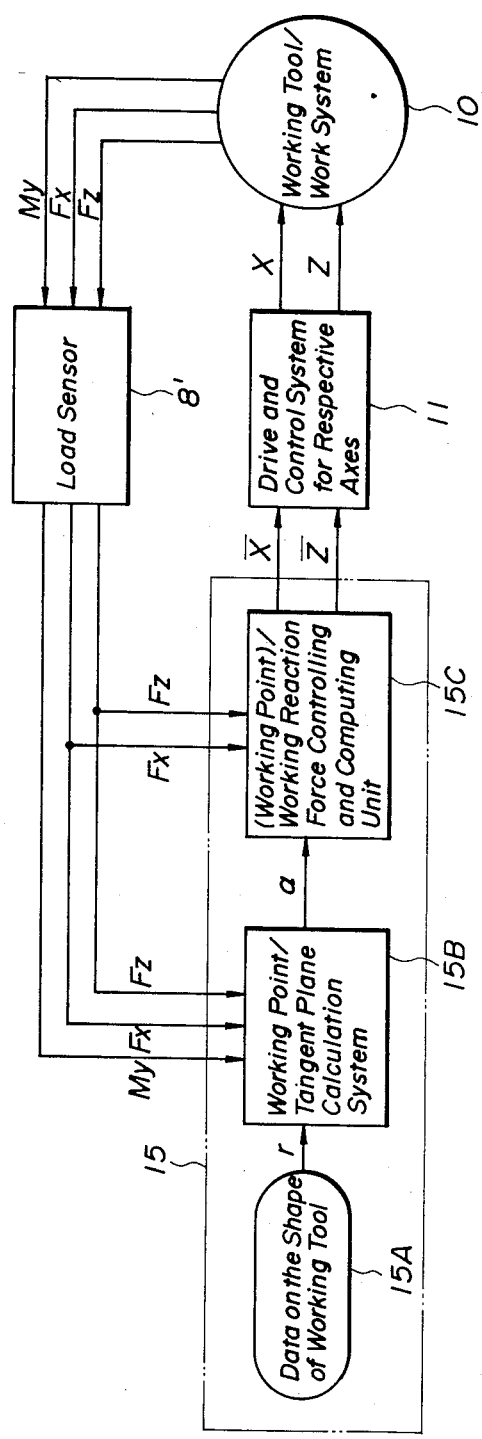
FIG. 8 is a system diagram of the profile working machine when the surface of the work changes two-dimensionally.
Figure 9:
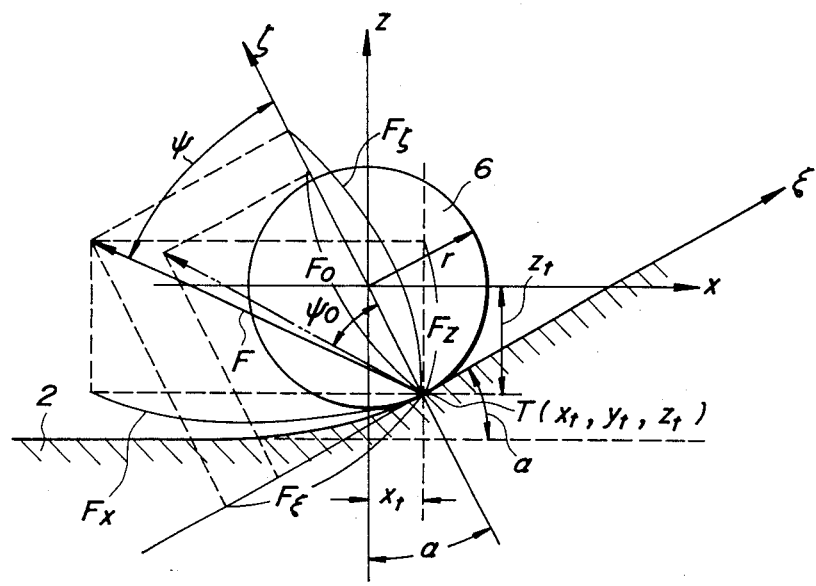
FIG. 9 is an enlarged front view of the working tool and work when the surface of the work changes two-dimensionally.

First of all, description will be made of a case in which a surface of the work 2, which surface is to be machined, changes two-dimensionally in the plane defined by the coordinate system x-z. FIG. 8 is the system diagram of a profile working machine applied to such a surface. FIG. 9 is an enlarged front view of the working tool 6 and the work 2 in the above case. In FIG. 8, similar units of system to those shown in FIG. 1 are indicated by like reference numerals. In this case, the displacement sensor 16 is omitted and the values input to and output from respective units are specifically given.

Figure 5:
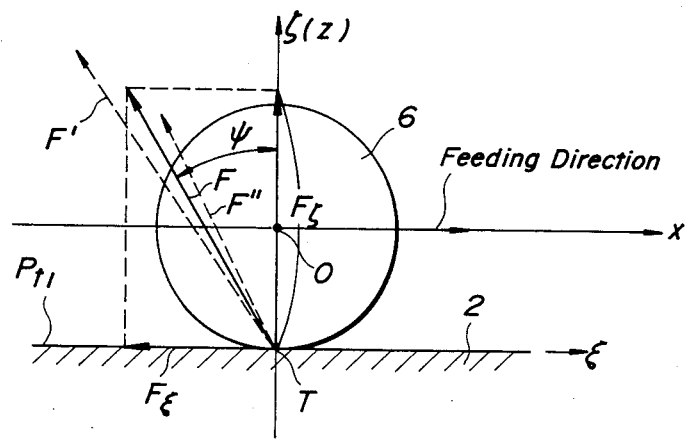
FIG. 5 is an enlarged front view of the working tool and work.

FIG. 9 illustrates a state in which the working tool 6 having a circular cross-section with the radius of r is machining a tilted surface of the work 2. Letter $\alpha$ indicates the angle of tilting of the tilted surface to the horizontal plane. Furthermore, the coordinate values of the working point T are $x_t$, $y_t$ and $z_t$ in which $y_t \equiv 0$). Let's now suppose that the machining work is moving from the horizontal surface to the tilted surface. When the optimum working conditions are maintained on the horizontal surface as shown in FIG. 5, the working reaction force has the magnitude $F_0$ and direction $\psi_0$. When the machining work has moved from the above state to the tilted surface, the coordinate axes $\xi, \zeta$ which pass through the working point T are also tilted respectively over the angle $\alpha$ and the working reaction force F has a direction tilted over the angle $\psi_0$ relative to the the $\xi$-axis, which has already been tilted over the angle $\alpha$. At this time, the magnitude and direction of the reaction force F change around the magnitude $F_0$ and direction $\psi_0$. With respect to the control algorithm in this case, it is only necessary to take into consideration that the coordinate system $\xi$-$\zeta$ is tilted over the angle $\alpha$ relative to the coordinate system x-z. The specific example illustrated in FIG. 8 is constructed by making use of practical means which take into account the relation in magnitude between the force component $F_\zeta$ and the optimum value $F_\zeta$ on the basis of a fact experimentally confirmed that the direction $\psi$ remains substantially around the constant value $\psi_0$.

The operation of the above specific example may be understood more readily when explained by means of numerical formulae. For this purpose, a general analysis will first be made of machining work on a curved surface, namely, on a worked surface which changes three-dimensionally. Thereafter, conditions will be given for profile-machining work in which the worked surface changes two-dimensionally. FIGS. 10(a), 10(b) and 10(c) are respectively an enlarged front view, enlarged plan view and enlarged side view of a working tool and a work. The working point T $(x_t, y_t, z_t)$ is not on any of the axes and changes three-dimensionally. Letter $y_0$ indicates the distance between the center O of the working tool 6 and the reference point Q of the load sensor 8'. Representing x-axis, y-axis and z-axis force components and x-axis, y-axis and z-axis moments, which are both output from the load sensor 8', by $F_x$, $F_y$ and $F_z$ and $M_x$, $M_y$ and $M_z$' respectively, the following equations can be established.

$$M_x = F_z(y_t + y_0) - F_y \cdot z_t \quad (5)$$

$$M_y = F_x \cdot z_t - F_z \cdot x_t \quad (6)$$

$$M_z = F_y \cdot x_t - F_x(y_t + y_0) \quad (7)$$

$$x_t^2 + y_t^2 + z_t^2 = r^2 \quad (8)$$

Among the above equations, Equations (5) to (7) represent relationship which can always be established between the force components $F_x, F_y, F_z$ and the moment components $M_x, M_y, M_z$, whereas Equation (8) represents that the working point T is located on the surface (a spherical surface having a radius r) of the working tool 6. From Equations (6) and (7), the following equations can be derived.

$$z_t = \frac{F_z \cdot x_t + M_y}{F_x} \quad (9)$$

$$y_t = \frac{F_y \cdot x_t - M_z}{F_x} - y_0 \quad (10)$$

Introducing Equations (9) and (10) into Equation (8) and solving Equation (8) with respect to $x_t$, $$x_t^2 + \left(\frac{F_y \cdot x_t - M_z}{F_x} - y_0\right)^2 + \left(\frac{F_z \cdot x_t + M_y}{F_x}\right)^2 = r^2 \quad (11)$$

$$F_x^2 \cdot x_t^2 + (F_y \cdot x_t - M_z - F_x \cdot y_0)^2 + (F_z \cdot x_t + M_y)^2 = F_x^2 \cdot r^2$$

$$(F_x^2 + F_y^2 + F_z^2)x_t^2 - 2\{F_y(M_z + F_x \cdot y_0) - F_z \cdot M_y\}x_t +$$

$$\{(M_z + F_x \cdot y_0)^2 + M_y^2 - F_x^2 \cdot r^2\} = 0$$

$$(F_x^2 + F_y^2 + F_z^2)x_t^2 - 2(F_y \cdot M_z - F_z \cdot M_y + F_x \cdot F_y \cdot y_0)x_t +$$

$$\{M_y^2 + M_z^2 + 2F_x \cdot M_z \cdot y_0 + F_x^2(y_0^2 - r^2)\} = 0$$

Here, supposing $$\left.\begin{array}{l} A = F_x^2 + F_y^2 + F_z^2 \\ B = F_y \cdot M_z - F_z \cdot M_y + F_x \cdot F_y \cdot y_0 \\ C = M_y^2 + M_z^2 + 2F_x \cdot M_z \cdot y_0 + F_x^2(y_0^2 - r^2) \end{array}\right\} \quad (12)$$

the solution of Equation 11 is $$x_t = \frac{B \pm \sqrt{B^2 - AC}}{A} \quad (13)$$

Introducing Equation (13) into Equations (9) and (10), $$y_t = \frac{F_y}{F_x} \cdot \frac{B \pm \sqrt{B^2 - AC}}{A} - \frac{M_z}{F_x} - y_0 \quad (14)$$

$$z_t = \frac{F_z}{F_x} \cdot \frac{B \pm \sqrt{B^2 - AC}}{A} + \frac{M_y}{F_x} \quad (15)$$

Based on the force components and moment components detected by the load sensor 8', it is possible to determine the coordinate values $(x_t, y_t, z_t)$ of the working point T shown in FIGS. 10(a) through 10(c). In each of Equations (13) to (15), one of the double symbol ± indicates an actual solution and the other symbol indicates the coordinate value of an imaginary point where a plane parallel to the tangential plane $P_t$ contacts the spherical surface of the working tool 6 except for the working point T. Unless the numerical values of the force components $F_x$, $F_z$ and the like are determined, it is not possible to tell which one of the double symbol indicates an actual solution.

Here, returning again to the two-dimensional curved surface shown in FIG. 9, a further discussion will be made. Since there are conditions of $F_y \equiv 0$ and $y_t \equiv 0$ in this case, Equation (5), (7) will become unnecessary because they are simplified respectively to the following obvious equations:

$$M_x = F_z \cdot y_0.$$

$$M_z = -F_x \cdot y_0$$

This means that the moment components $M_x, M_y$ can be calculated from the force components $F_x, F_z$ and distance $Y_o$ without need for detecting them specifically. In this case, Equations (6) and (8) have significance. Equation (6) is $$M_y = F_x \cdot z_t - F_z \cdot x_t \quad (16)$$

as shown above. Since $Y_t \equiv 0$, Equation (8) becomes as follows:

$$x_t^2 + z_t^2 = r^2 \quad (17)$$

From Equations (16) and (17) or introducing $F_y = 0$ and $y_t = 0$ into Equations (13) to (15), the coordinate values $(x_t, z_t)$ of the working point T shown in FIG. 9 are expressed as follows:

$$x_t = \frac{-F_z \cdot M_y \pm F_x \sqrt{(F_x^2 + F_z^2)r^2 - M_y^2}}{F_x^2 + F_z^2} \quad (18)$$

$$z_t = \frac{F_x \cdot F_y \pm F_z \sqrt{(F_x^2 + F_z^2)r^2 - M_y^2}}{F_x^2 + F_z^2} \quad (19)$$

In the state depicted in FIG. 9, $F_z > 0$ and $F_x < 0$. Accordingly, the negative symbol (−) out of the double symbol indicates the coordinate values of the working point T.

Here, the angle $\alpha$ of tilting is to be determined. From FIG. 9, $$\alpha = \tan^{-1}\left(-\frac{x_t}{z_t}\right) \quad (20)$$

$$= \tan^{-1}\left\{\frac{F_z \cdot M_y \mp F_x \sqrt{(F_x^2 + F_z^2)r^2 - M_y^2}}{F_x \cdot M_y \pm F_z \sqrt{(F_x^2 + F_z^2)r^2 - M_y^2}}\right\}$$

Therefore, the angle of tilting of the tilted surface shown in FIG. 9, which tilted surface is to be machined by the working tool 6, namely, the tangential plane $P_t$ can be determined.

Where the working point T is always located on lines extending in the feeding direction (in the direction of the $\xi$-axis in this case) as depicted in FIG. 9, control of the working point T is unnecessary and mere control of the working reaction force F is sufficient.

From the foregoing explanation, the working point/tangential plane calculation system 15B receives the force components $F_x, F_z$ and the moment component $M_y$ from the load sensor 8' and the radius r of the working tool 6 from the working tool shaped data memory 15A, performs an operation in accordance with Equation (20), and then outputs the angle $\alpha$ of tilting of the tangential plane $P_t$ to the working point/working reaction force controlling and computing unit 15C.

The operation performed by the working point/working reaction force controlling and computing unit 15C will next be described. In the case shown in FIG. 9, the control of the working point T is not necessary, and the control of the working reaction force F is sufficient as mentioned above. Accordingly, the force components $F_x, F_z$ are input from the load sensor 8'. Based on these force components $F_x, F_z$ and the above-input angle $\alpha$ of tilting which indicates the tangential plane $P_t$, the following operation is performed. First of all, the respective force components $F_\xi, F_\zeta$ on the coordinate system $\xi$-$\zeta$ are determined in FIG. 9. Using a general equation for coordinate transformation upon rotating the coordinate axes clockwise over the angle $\alpha$ while sharing the same origin, they can be determined in accordance with the following equations:

$$F_\xi = F_x \cos \alpha + F_z \sin \alpha \quad (21)$$

$$F_\zeta = F_z \cos \alpha - F_x \sin \alpha \quad (22)$$

Here, the direction $\psi$ of the reaction force measured from the $\zeta$-axis is $$\psi = \tan^{-1}(-F_\xi/F_\zeta) \quad (23)$$

Based on the thus-determined force component $F_\zeta$ and direction $\psi$, operations are performed to determine the values $\overline{X}, \overline{Z}$ which allow the force component $F_\zeta$ and direction $\psi$ to have their respective optimum values $F_{\zeta 0}, \psi_0$. As already mentioned in the description of the controlling and computing unit 12 shown in FIG. 6, the above operations were controlled in such a way that when $F_\zeta \approx F_{\zeta 0}$, the working tool 6 advanced in the direction $\phi = 0$. Here, it is however necessary to calculate the outputs X,Z which causes the working tool 6 to advance in the direction $\phi = \alpha$, that is, the direction extending along the surface to be worked. Hereinafter, the direction $\phi$ (the direction relative to the $\xi$-axis) in which the working tool 6 should be advanced and the speeds $v_x, v_z$ at which the working tool 6 should be advanced respectively in the directions of the x-axis and z-axis will be determined. However, similar to the above-described case, ψ is deemed to be equivalent to ψ₀ ($\psi \approx \psi_0$).

Figure 11A:
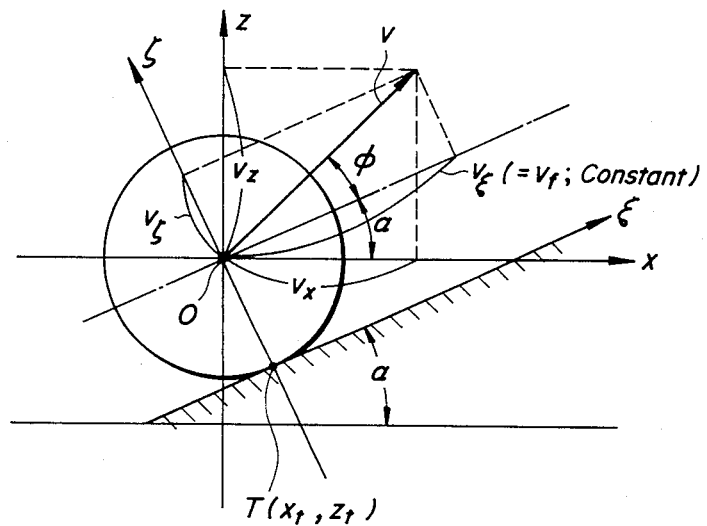
Figure 11B:
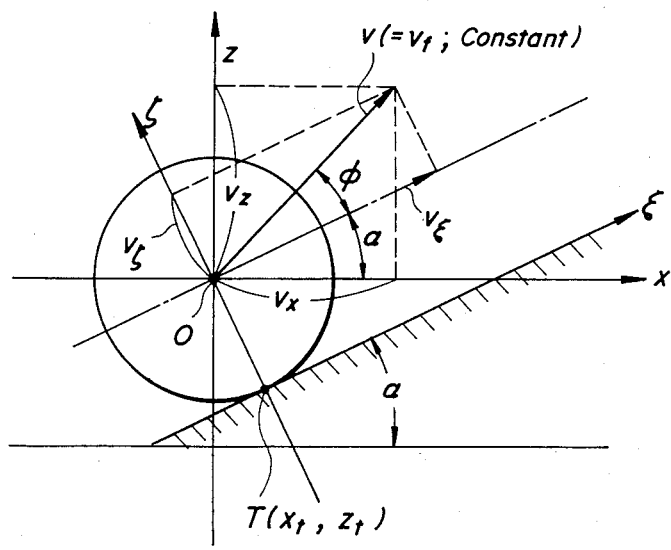

When determining these values $\phi$, $v_x$ and $v_z$ in the above case, the discussion was made separately under two situations, one considering the feeding speed $v_f$ to be always constant in the direction of the ξ-axis and the other considering the feeding speed $v_f$ as a constant momentary feeding speed. Following the same approach, the present case will also be discussed separately under the above-mentioned two situations. FIG. 11(a) is an enlarged front view of the working tool and work under the former situation, while FIG. 11(b) is an enlarged side view of the same working tool and work under the latter situation. In each of the figures, letter v indicates the magnitude of the speed at which the working tool 6 should be advanced.

First of all, general formulae for determining the components $v_x, v_z$ on the x-z coordinate system from the components $v_\xi, v_\zeta$ on the ξ-ζ coordinate system are represented as follows:

$$\left. \begin{array}{l} v_x = v_\xi \cos\alpha - v_\zeta \sin\alpha \\ v_z = v_\xi \sin\alpha + v_\zeta \cos\alpha \end{array} \right\} \quad (24)$$

Then, the values $v_x, v_z, \phi$ under the former situation depicted in FIG. 11(a) are now determined. Since $v_\xi \equiv v_f$, these values are represented as follows from Equations (1), (22) and (24) and the relationship shown in FIG. 11(a):

$$v_x = v_f \cos\alpha - A_1(F_z\cos\alpha - F_x\sin\alpha - F_0\cos\psi_0)\sin\alpha \quad (25)$$

$$v_z = v_f \sin\alpha + A_1(F_z\cos\alpha - F_x\sin\alpha - F_0\cos\psi_0)\cos\alpha \quad (26)$$

$$\phi = \tan^{-1}\left(\frac{v_\zeta}{v_\xi}\right) = \quad (27)$$

$$\tan^{-1}\left\{ \frac{A_1}{v_f}(F_z\cos\alpha - F_x\sin\alpha - F_0\cos\psi_0) \right\}$$

On the other hand, the values $v_x, v_z, \phi$ under the latter situation illustrated in FIG. 11(b) are next determined. From Equations (3), (22) and (24) and the relationship shown in FIG. 11(b), these values can be expressed as follows:

$$v_x = \sqrt{v_f^2 - A_1^2(F_z\cos\alpha - F_x\sin\alpha - F_0\cos\psi_0)^2} \cdot \cos\alpha - A_1(F_z\cos\alpha - F_x\sin\alpha - F_0\cos\psi_0)\sin\alpha \quad (28)$$

$$v_z = \sqrt{v_f^2 - A_1^2(F_z\cos\alpha - F_x\sin\alpha - F_0\cos\psi_0)^2} \cdot \sin\alpha + A_1(F_z\cos\alpha - F_x\sin\alpha - F_0\cos\psi_0)\cos\alpha \quad (29)$$

$$\phi = \sin^{-1}\left(\frac{v_\zeta}{v_f}\right) = \quad (30)$$

$$\sin^{-1}\left\{ \frac{A_1}{v_f}(F_z\cos\alpha - F_x\sin\alpha - F_0\cos\psi_0) \right\}$$

Whichever the situation is, it is only necessary to calculate the values, $\overline{X}, \overline{Z}$ as outputs from the working point/working reaction force controlling and computing unit 15C by considering $\dot{X}$ and $\dot{Z}$ to be equal respectively to $v_x$ and $v_z$ ($\dot{X}=v_x$, $\dot{Z}=v_z$).

Let's now compare the former situation and the latter situation with each other. No big difference arises between the situations when the tilted surface of the angle α of tilting changes gradually. Where the tilted surface has such a complex shape that its curvature changes significantly at a given point in the course of machining, a big difference arises between both situations. In such a case, the working speed along the profile of the work can be always kept at the value $v_f$ under the latter situation. Accordingly, most ideal working conditions can be obtained when the value $v_f$ is chosen as an ideal feeding speed. By the way, both of the above methods have been given as mere examples of various methods. Basically speaking, any methods may be employed so long as the locus of the working tool 6 can be controlled so as to maintain the magnitude F and the direction ψ of the working reaction force at their respective optimum values.

Figure 7:
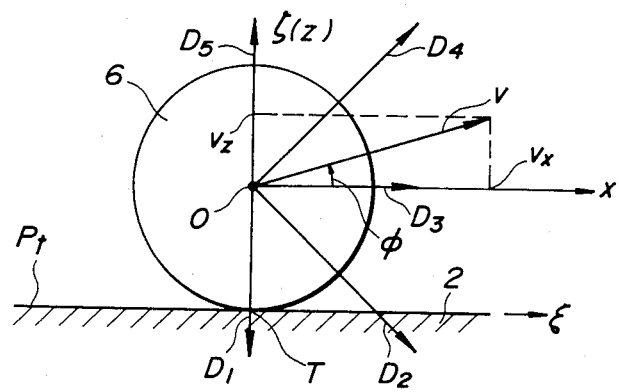
FIG. 7 is an enlarged front view of the working tool and work for explaining the operation of a controlling and computing unit.
Figure 12:
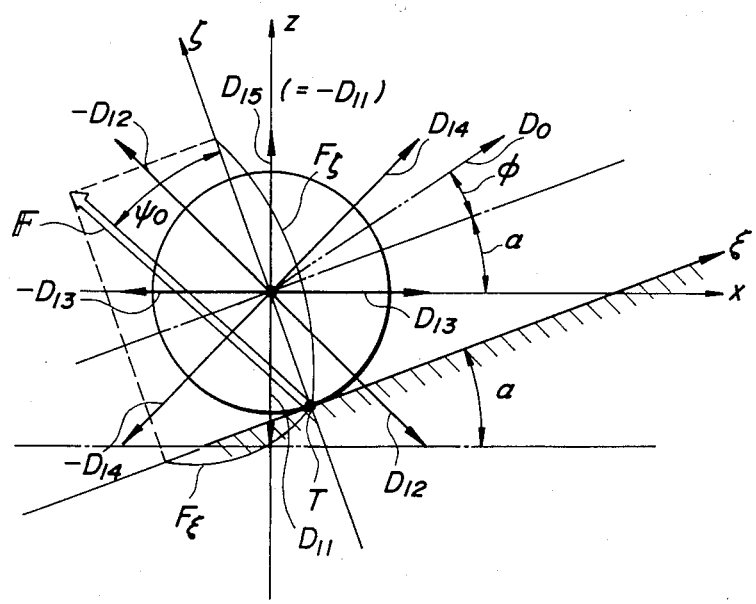
FIGS. 11(a) and 11(b) and FIG. 12 are enlarged front views of the working tool and work for explaining the operation of the controlling and computing unit depicted in FIG. 8.

The operation by the working point/working reaction force controlling and computing unit 15C has been described above. In this case, it is also possible to employ simplified means similar to the operation at the previously-described controlling and computing unit 12. This means will next be described with reference to FIG. 12 and Table 2. FIG. 12 is an enlarged front elevation of the working tool and the work. In the figure, $D_{11}$, $D_{12}$, $D_{13}$, $D_{14}$, $D_{15}$ ($=-D_{11}$), $-D_{12}$, $-D_{13}$ and $-D_{14}$ are vectors which indicate the magnitudes and directions of speeds preset about the point O. They are equivalent to the vectors $D_1$–$D_5$ shown in FIG. 7. In the simplified means, an angle ($\phi+\alpha$) obtained by adding the input angle α to the angle $\phi$ calculated in accordance with Equation (27) or Equation (30) is classified into 9 ranges. By making these 9 ranges correspond to the respective vectors, the x-axis component $v_x$ and z-axis component $v_z$ of each of the vectors are obtained. Values to be obtained when the nine ranges are rendered corresponding to the vectors respectively in the above manner are given in Table 2.

TABLE 2

| $\phi + \alpha$ | Direction $D_i$ | $v_x$ | $v_z$ |
|---|---|---|---|
| $-180° < \phi + \alpha < -157.5°$ | $-D_{13}$ | $-v_0$ | 0 |
| $-157.5° \leq \phi + \alpha < -112.5°$ | $-D_{14}$ | $-v_0$ | $-v_0$ |
| $-112.5° \leq \phi + \alpha < -67.5°$ | $D_{11}$ | 0 | $-v_0$ |
| $-67.5° \leq \phi + \alpha < -22.5°$ | $D_{12}$ | $-v_0$ | $-v_0$ |
| $-22.5° \leq \phi + \alpha < 22.5°$ | $D_{13}$ | $v_0$ | 0 |
| $22.5° \leq \phi + \alpha < 67.5°$ | $D_{14}$ | $v_0$ | $v_0$ |
| $67.5° \leq \phi + \alpha < 112.5°$ | $D_{15}$ | 0 | $v_0$ |
| $112.5° \leq \phi + \alpha < 157.5°$ | $-D_{12}$ | $-v_0$ | $v_0$ |
| $157.5° \leq \phi + \alpha < 180°$ | $-D_{13}$ | $-v_0$ | 0 |

The working point/working reaction force controlling and computing unit 15C receives the values $F_x, F_z, \alpha$ and then calculates continuously the value $\phi$ in accordance with Equation (27) or (30). Description will now be made of a case in which Equation (30) is to be used. Supposing first of all that $A_1$ is chosen to be $v_f/F_{\zeta 0}$ which is considered to be a reasonable value ($A_1 = v_f/F_{\zeta 0}$), the value $\phi$ will fall within the range of from $-90°$ to $90°$ ($-90° \leq \phi \leq 90°$) provided that the force component $F_\zeta$ is controlled within the range of from 0 to $2F_{\zeta 0}$ ($0 \leq F_\zeta \leq 2F_{\zeta 0}$). Even if $F_\zeta$ should become greater than $2F_{\zeta 0}$ ($F_\zeta > 2F_{\zeta 0}$), there will be no problem from the viewpoint of control if the value $\phi$ is defined in advance to be 90° ($\phi = 90°$) throughout the range.

Since the value $\alpha$ is normally from $-90°$ to $90°$ (exclusive, i.e., $-90°<\alpha<90°$), the angle $(\phi+\alpha)$ falls between $-180°$ and $180°$ (exclusive, i.e., $-180°<\phi+\alpha<180°$). The vector $D_0$ indicated by a two-dot line in FIG. 12 should be the most ideal advancing direction for a calculated angle $(\phi+\alpha)$. It is necessary to choose the direction $D_i$ having a classified advancing direction close to the vector $D_0$, $D_{14}$ in the case of FIG. 12. The classification has been coarsely made 45° by 45° and the values $v_x, v_z$ are each limited to the three-values 0, $v_0$, $-v_0$. However, smooth control is still feasible without encountering any problems from the viewpoint of control because the cycle time of the operation is very small as mentioned above. Since the working point/working reaction force controlling and computing unit 15C outputs simply the above-mentioned three values only, the computing system can be considerably simplified.

As a still simpler method, it may also be contemplated to determine first of all the angle $\alpha$ (which will be referred to as "$\phi_1$") shown in Table 1, then to judge in which angle range of Table 2 the angle $(\phi_1+\alpha)$ is contained, and finally to choose the advancing direction $D_i$ of the working tool 6. In such a method, the value of the force component $F_\zeta$ is, however, discretely divided upon determination of the angle $\phi_1$ and is further divided discretely upon determination of the angle $(\phi_1+\alpha)$. Therefore, discrete classification is effected twice. Therefore, a direction to be obtained in the above-described two-step operation may deviate as much as about 45° or so at the maximum from its corresponding ideal direction which can be obtained through a continuous operation. Accordingly, use of the above-described means is a method inferior to the previously-described method. However, it is still usable for actual applications.

Description has been made of a case, that is, the first specific example of the present embodiment, in which specific example the worked surface of the work 2 changed two-dimensionally within a plane of the x-z coordinate system. The second specific example of this invention will next be described.

As the second specific example, description will be made of a case in which the worked surface of the work 2 changes three-dimensionally. In this case, the profile working machine depicted in FIG. 1 is used. Here, the relationship between the working tool 6 and the work 2 will be in such state as shown in FIGS. 10(a) through 10(c). In the course of the above-described discussion of the first specific example, a general analysis has already been made of the machining work on a curved-surface which changes three-dimensionally. Therefore, making use of the general analysis, the profile working machine shown in FIG. 1 will be described in the present specific example.

The working reaction force F ($F_x, F_y, F_z$) and the moment M ($M_x, M_y, M_z$) produced on the basis of the reaction force, which reaction force and moment have been detected by the load sensor 8', as well as data S on the shape of the working tool are input to the working point/tangential plane calculation system 15B, thereby determining the coordinate values $(x_t, x_y, x_z)$ of the contact point T (working point) between the working tool 6 and the work 2. Namely, the above-described Equation (5) to Equation (7) are established between the respective force components $F_x, F_y, F_z$ and the moment components $M_x, M_y, M_z$ and the coordinate values of the working point T. Furthermore, Equation (8) is also satisfied as the working point T is located on the surface of the working tool 6. Accordingly, the coordinate values $(x_t, y_t, z_t)$ of the working point T can be determined from Equation (5) to Equation (8) as expressed in Equation (13), Equation (14) and Equation (15). In addition, the tangential plane $P_t$ can also be determined as a plane which extends through the working point T and is perpendicular to the line O-T. The above calculations are feasible when the axes of the X-Y-Z coordinate system are respectively kept in parallel with their corresponding axes of the x-y-z coordinate system. When the relative angles $\widehat{H}$) $(\theta_1, \theta_2, \theta_3)$ of spatial orientation between the working tool 6 and the work 2 are changed or instead of the orthogonal coordinate system, a cylindrical coordinate system (a coordinate system employed where the relative positions of the working tool 6 and work 2 change in a cylindrical form) is used by way of example, the coordinates of the working point T and the tangential plane $P_t$ cannot be determined unless the values X, $\widehat{H}$) detected by the displacement sensors 16 are used. In such a case, a variety of calculation equations may be contemplated depending, for example, on which axes the coordinate system for the rotary angles $\theta_1, \theta_2, \theta_3$ has its reference axes and when the used coordinate systems are not orthogonal coordinate systems, what relationship should be established between the coordinate systems. It is extremely complex to show such various cases by general equations. Moreover, it is not believed that the present embodiment becomes unclear unless such general equations are given. Therefore, description of such general equations is omitted.

The working point/working reaction force controlling and computing unit 15C is fed with the coordinate values of the working point T and the tangential plane $P_t$, both determined by the working point/tangential plane calculation system 15B, as well as the reaction force F detected by the load sensor 8' and the relative positions X and relative angles $\widehat{H}$) of spatial orientation of the working tool 6 and the work 2, which positions and angles have been detected by the displacement sensors 16. On the basis of these values, the working point/working reaction force controlling and computing unit 15C calculates the displacement $\overline{X}, \widehat{\overline{H}}$) and the velocities $\dot{X}, \widehat{\dot{H}}$) which the control systems for the corresponding axes should produce in order to maintain the working point T within a range required for conducting desirable machining and, at the same time, in order to maintain the magnitude F and the direction $\psi$ of the working reaction force of the working tool 6 respectively at the values $F_0$, $\psi_0$ while the desirable working conditions are achieved. These calculations are performed by means similar to that described in the first specific example. In usual cases except for such a simple case as defined by the X-Y-Z and x-y-z coordinate systems in which the coordinate axes of the main body of the working machine are parallel to the corresponding coordinate axes of the working tool, it is however, necessary (different from the first specific example), to perform operations inclusive additionally of the control of the working point T on the basis of the value T determined by the working point/tangential plane calculation systems 15B and the values X, $\widehat{H}$) detected by the displacement sensors 16. This operation which is performed to control the working point T will next be described as the third specific example.

The drive and control systems 11 for the respective axes are fed with the values $\overline{X}, \widehat{\overline{H}}$), calculated by the working point/working reaction force controlling and computing unit 15C. They then actuate, in accordance with the thus-input values $\bar{X}$, $\bar{\textcircled{H}}$) the servomechanisms of their respective control axes, the number of which corresponds to the degree of freedom of the working machine per se, and realize the actual displacements $\tilde{X}$, $\tilde{\textcircled{H}}$) which are equal to the values $\bar{X}$, $\bar{\textcircled{H}}$) input thereto.

By constructing in the above-described manner, it is always possible to keep the working conditions within their respective optimum ranges without causing the working point T to depart from the machinable range of the working tool 6 even if the work 2 contains for example a portion at which its shape changes extremely.

Next, a simple example of the working point control and calculation which are performed by the working point/working reaction force controlling and computing unit 15C as mentioned above will be described.

Figure 13:
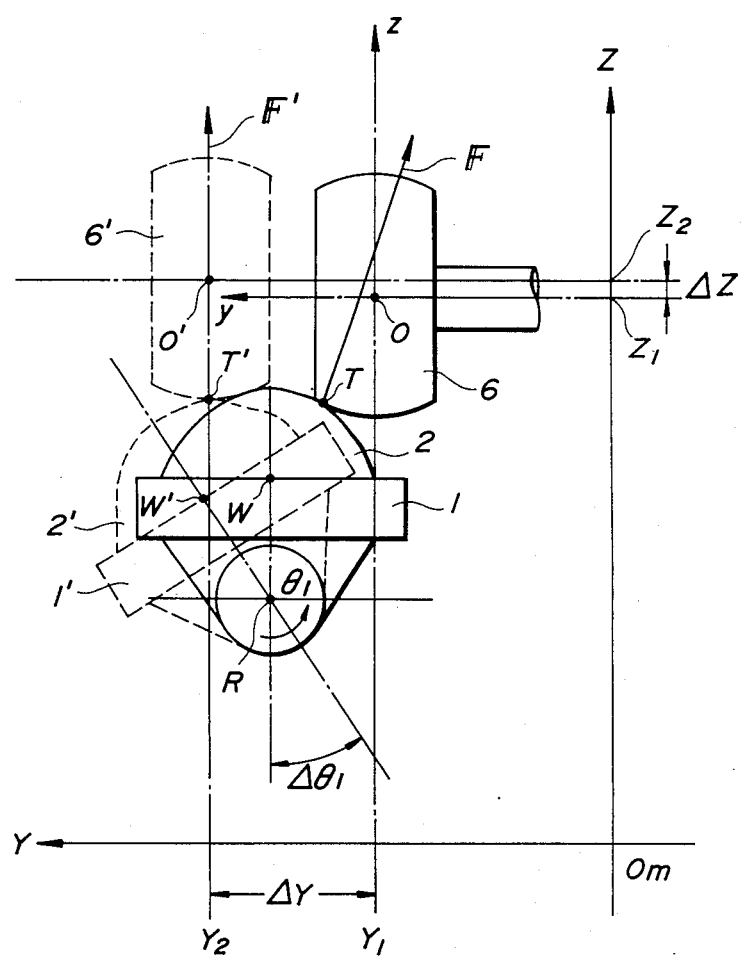
FIG. 13 is an enlarged front view of the working tool and work for explaining the operation of the controlling and computing unit shown in FIG. 1.

FIG. 13 is an enlarged side view of the working tool, the work and the table, which are seen in the same direction as in FIG. 4(c). In the figure, the table, the work and the working tool are indicated respectively by numerals 1, 2 and 6. The respective coordinates are set in the same manner as those shown in FIGS. 4(a) through 4(c). The figure shows a case in which the working point T is in the course of departing from the machinable range of the working tool 6. By the way, where the working tool 6 has such configurations as illustrated in the figure, it is desirable that the working point T is positioned near the central part of the working tool 6 (on the z-axis). It is necessary at least to avoid situations in which the working point T is apart from the working tool 6. For this purpose, it is desirable to keep the working point T in the (x-z) plane in other words, to keep the coordinate value $y_t$ at 0. For practical applications, it is, however, not necessary to satisfy $y_t = 0$. It is sufficient so long as the coordinate values $y_t$ falls within a permissible range.

In order to shift the coordinate value $y_t$ of the working point T to 0 as mentioned above, the rotary system $\theta_1$ which has the axis R of the table 1 as its central axis of rotation is turned over an angle of $\Delta\theta_1$. By doing so, the relative angles of spatial orientation between the working tool 6 and the work 2 are caused to change, thereby shifting the work reference point W established fixedly on the work 2 to a new point indicated by the letter W' and at the same time, also shifting the working point T to a new point indicated by letter T'. By the way, it is desirable from the ideal viewpoint to allow the rotary system $\theta_1$ to turn about the point T because such an arrangement does not cause the movement of the point T to the point T' by the rotation. It is, however, difficult to achieve such a structure from the viewpoint of mechanism designing. In fact, it is impossible to achieve such a structure because the point T changes moment by moment. Then, the center O of the working tool 6 is shifted to the new point O' so that the work 2 can be machined at the new point T' by the working tool 6 in its lowest position. For this purpose, the present center O ($Y_1, Z_1$) is moved to the new center O' ($y_2, Z_2$) by their respective differences $\Delta Y$ and $\Delta Z$ within the plane defined by the coordinate axes Y and Z in the X-Y-Z coordinate system which has been fixedly established on the main body of the working machine. The outputs resulted solely from the above operation are now represented by values $\bar{Y}_t, \bar{Z}_t, \bar{\theta}_{1t}$. By substituting these values for the axes, Y,Z$\theta$ of the drive and control systems 11 shown in FIG. 1, the relative relation between the working tool 6 and the work 2 is maintained in such a state that they can always be brought into mutual contact at the new point T' shown in FIG. 13. The working reaction force F' at the new point T' is always maintained in the (x-z) plane which has been fixedly established on the working tool 6.

When the working tool 6 and work 2 are held in the above state, they are in the same state as that shown in FIG. 9. Accordingly, it is possible to apply the same method as that employed to control the working reaction force in FIG. 9. Supposing that the outputs be values $\bar{X}_f, \bar{Z}_f$ when the control of the working reaction force is solely taken into consideration, the outputs $\bar{X}, \bar{Y}, \bar{Z}, \bar{\theta}_1$ from the working point/working reaction force controlling and computing unit 15C illustrated in FIG. 1 are expressed respectively as follows:

$$\bar{X} = \bar{X}_f$$

$$\bar{Y} = \bar{Y}_t$$

$$\bar{Z} = \bar{Z}_t + \bar{Z}_f$$

$$\bar{\theta}_1 = \bar{\theta}_{1f}$$

Namely, the unit 15C outputs the sums. It should, however, be borne in mind that such an adding operation of respective calculation results as described above is permissible only in a simple linear system like the present specific example. At the working point/working reaction force controlling and computing unit 15C, there are usually computed outputs $\bar{X}, \bar{Y}, \bar{Z}, \bar{\theta}_1, \bar{\theta}_2, \bar{\theta}_3$ which satisfy both working point control and working reaction force control at the same time. It is however, impossible to express the above outputs of general cases by numerical equations without encountering complication. It is believed that the control of working point and the function of the working point/working reaction force controlling and computing unit 15C, which function relies upon the control of the working point, can be fully understood from the above description of the simple linear system. Accordingly, explanation of numerical equations in general cases is omitted.

Description has been made of the first, second and third specific examples. From the above description, the structure of the embodiment according to this invention, which embodiment is shown in FIG. 1, and its operation are believed to have been fully understood. Owing to the structure of the present embodiment, it is possible to automatically machine under ideal working conditions a work having a curved-surface the exact configurations of which are unknown. As a result, it is feasible to save man power for machining work and to make the finishing accuracy of machining work uniform. In addition, the present invention facilitates the machining of three-dimensional curved-surfaces, which machining has to be effected principally in accordance with grinding work such as machining of ceramics. Furthermore, it is also possible to omit irksome work such as input of data on the configurations of complex curved-surfaces in conventional automatic working machines. Since the working or machining is carried out while tracing the curved-shape of each work, it is possible to perform deburring or polishing work even if the shape of the work has not precisely been known like a cast or forged material. As a result of the working, data can be collected on the shape of the work. Accordingly, the working in the subsequent steps can be efficiently preceeded with. In other words, making positive use of the function that the working is carried out while tracing the surface configurations of each work, it is feasible to roughly finish a work, the exact configurations of which are unknown, and at the same time to recognize the surface configurations, and then to perform fine fishing of the work by using data on the surface configurations.

By the way, the above embodiment has been described using the orthogonal coordinate system as a principal coordinate system. Depending on work shapes to be machined, the cylindrical coordinate system and other suitable coordinate systems may be employed as needed. In the above embodiment, the control of the relative positions of the working tool and the work is performed by the working tool, whereas the control of the relative angles of their spatial orientation is effected by the table. Needless to say, the control of the spatial orientation and that of the positions may conversely be effected by the working tool and the table, respectively. In addition, the present invention can be applied to any profile working machine no matter whether the working is grinding or cutting work. It should also be borne in mind that the working tool is not necessarily limited to a spherical member having the radius r given by way of example in the above embodiment. Depending on the details of individual machining work, working tools of any shapes may be suitably employed by making use of data on the shapes of the working tools.

Furthermore, the present invention may be applied to both grinding work and cutting work. However, the matter mentioned above to the effect that the direction $\psi$ of the working reaction force F becomes approximately almost constant has been derived from experimental data on cutting work. Such matter, namely, the correlation among parameters which varies in accordance with each working condition can simplify, no matter whether the working is grinding work or cutting work, the structure of the controlling and computing unit to a significant extent provided that the correlation is used as much as possible.

When practicing this invention, it is necessary to take the following matter into consideration. Namely, the degree of a change of the working reaction force F when the relative positions and relative spatial orientations between the working tool and the work have changed is great even for slightest changes in the relative positions and relative spatial orientations because the working machine is designed to have a high degree of rigidness. Since the control system of the present invention contains the working tool/work system in its control loop, the above-mentioned high degree of change of the working reaction force renders the loop gain very high and hence oscillates the control system, thereby creating an unstable state. To avoid this problem, it may in some instances be better to contemplate the interposition of a compliance mechanism on each of axes between the working tool and the work, thereby lowering the rigidity within a range in which ideal working conditions can be secured.

Where the working is cutting work, attention should be paid to the following matter. Namely, the shape and dimensions of the working tool vary in the the cutting work as the cutting work proceeds (where the working tool has for example a spherical surface having a radius r as in the above-described embodiment, the working tool undergoes deformation so that its radius may be reduced or its spherical shape may be deformed into an ellipsoid). If the cutting work should be continued without paying any attention to the above variations in shape and dimensions, it will obviously be impossible to achieve the desired working accuracy. Therefore, in order to always maintain the working accuracy at a desired level during each working operation, it is required to measure the shape of the working tool repeatedly at a suitable interval so that the data on the shape of the working tool can be corrected to or replaced by exact values or to apply a tool-dresser to the working tool so as to keep the working tool always in a prescribed shape.

Having now fully described the invention, it will be apparent to one or ordinary skill in the art that many changes and modifications can be made thereto without departing from the spirit or scope of the invention as set forth herein.

We claim:

1. A profile working machine equipped with a support for holding in place a work having a given profile, a working tool for machining the work, and drive and control systems for controlling the relative displacements between the support and the working tool and adapted to machine the work along said given profile, said profile working machine comprising:

a load sensor for detecting each force and moment to be developed between the working tool and the work;

a first computing unit for computing a working point and a tangential plane extending through the working point and in contact with the working tool, on the basis of the force and moment detected by the load sensor;

a second computing unit for computing, based on the working point and tangential plane computed by the first computing unit and the forces detected by the load sensor, the values of the relative displacements between the working tool and the support in order to keep the magnitude and the direction of a reaction force exerted on the working tool on predetermined values; and output means for outputting the values computed at the second computing unit to the drive and control systems.

2. A profile working maching according to claim 1, wherein the second computing unit comprises:

direction computing means for computing a direction in which the working tool should be advanced, on the basis of said each force and moment detected by the load sensor and the angle of the tangential plane obtained by the first computing unit;

selection means for selecting one preset direction out of a plurality of prescribed directions in a prescribed coordinate system, on the basis of a value obtained by the direction computing means; and output means for outputting the relative speed between the working tool and the support, which relative speed is determined corresponding to the direction selected by the selection means.

3. A profile working machine comprising:

(a) a support for holding in place a work having a given profile;

(b) a working tool for machining the work;

(c) drive and control systems for controlling the relative displacements between said support and said working tool;

(d) a load sensor for detecting each force and each moment developed between said working tool and the work;
(e) a first computing unit for computing a working point and a tangential plane extending through the working point and in contact with said working tool, on the basis of the forces and the moments detected by said load sensor;
(f) a second computing unit for computing, based on the working point and the tangential plane computed by said first computing unit and the forces detected by said load sensor, the values of the relative displacements between said working tool and said support in order to keep the magnitude and the direction of a reaction force exerted on said working tool on predetermined values; and
(g) output means for outputting the values computed by said second computing unit to said drive and control systems, whereby said profile working machine machines the work along the given profile.

4. A profile working machine according to claim 3 wherein said second computing unit comprises:
(a) direction computing means for computing a direction in which said working tool should be advanced, on the basis of the forces and the moments detected by said load sensor and the angle of the tangential plane computed by said first computing unit;
(b) selection means for selecting one direction out of a plurality of preset directions in a prescribed coordinate system, on the basis of a value obtained by said direction computing means; and
(c) output means for outputting the relative speed between said working tool and said support, which relative speed is determined corresponding to the direction selected by said selection means.

* * * * *